United States Patent [19]

Toy et al.

[11] Patent Number: 5,501,722
[45] Date of Patent: Mar. 26, 1996

[54] NATURAL GAS TREATMENT PROCESS USING PTMSP MEMBRANE

[75] Inventors: Lora G. Toy, San Francisco; Ingo Pinnau, Palo Alto, both of Calif.

[73] Assignee: Membrane Technology and Research, Inc., Menlo Park, Calif.

[21] Appl. No.: 389,730

[22] Filed: Feb. 15, 1995

Related U.S. Application Data

[63] Continuation of Ser. No. 153,272, Nov. 16, 1993, abandoned, which is a continuation of Ser. No. 970,699, Nov. 4, 1992, abandoned.

[51] Int. Cl.⁶ .................................................. B01D 53/22
[52] U.S. Cl. .................................................. 95/50; 95/45
[58] Field of Search ............................ 95/45, 50; 55/524; 96/4, 11–14

[56] References Cited

U.S. PATENT DOCUMENTS

| | | | |
|---|---|---|---|
| 4,370,150 | 1/1983 | Fenstermaker | 55/16 |
| 4,657,564 | 4/1987 | Langsam | 55/16 |
| 4,659,343 | 4/1987 | Kelly | 55/16 |
| 4,689,267 | 8/1987 | Takamizawa et al. | 55/16 X |
| 4,714,481 | 12/1987 | Matsuura et al. | 55/16 X |
| 4,755,193 | 7/1988 | Higashimura et al. | 55/16 |
| 4,759,776 | 7/1988 | Langsam et al. | 55/16 |
| 4,857,078 | 8/1989 | Walter | 55/16 |
| 4,859,215 | 8/1989 | Langsam et al. | 55/16 |
| 4,931,181 | 6/1990 | Blume et al. | 210/500.27 |
| 4,994,094 | 2/1991 | Behling et al. | 55/16 |
| 5,013,338 | 5/1991 | Anand et al. | 55/16 X |
| 5,089,033 | 2/1992 | Wijmans | 55/16 |
| 5,609,686 | 12/1992 | Baker et al. | 55/16 |

FOREIGN PATENT DOCUMENTS

| | | | |
|---|---|---|---|
| 3940520 | 6/1991 | Germany | 55/16 |
| 60-212414 | 10/1985 | Japan | 55/158 |
| 61-015718 | 1/1986 | Japan | 55/158 |
| 61-035803 | 2/1986 | Japan | 55/158 |
| 61-071820 | 4/1986 | Japan | 55/158 |
| 61-161120 | 7/1986 | Japan | 55/158 |
| 61-268745 | 11/1986 | Japan | 55/158 |
| 62-033526 | 2/1987 | Japan | 55/158 |
| 63-065932 | 3/1988 | Japan | 55/158 |
| 63-214319 | 9/1988 | Japan | 55/158 |
| 63-236515 | 10/1988 | Japan | 55/158 |
| 63-310622 | 12/1988 | Japan | 55/158 |
| 01-007927 | 1/1989 | Japan | 55/158 |
| 02-241599 | 9/1990 | Japan | 55/158 |
| 03-038225 | 2/1991 | Japan | 55/158 |

OTHER PUBLICATIONS

K. Takada et al., "Gas Permeability of Polyacetylenes Carrying Substituents", Journal of Applied Polymer Science, vol. 30, pp. 1605–1616, 1985.

M. Langsam et al., "Substituted Propyne Polymers", Gas Separation and Purification, vol. 2, pp. 162–170, 1988.

K. Nakagawa et al., "Polyacetylene Derivatives as Membranes for Gas Separation", Gas Separation and Purification, vol. 2, pp. 3–8, 1988.

S. Asakawa et al., "Composite Membrane of Poly[1–(trimethylsilyl)–propyne] as a Potential Oxygen Separation Membrane", Gas Sep. & Purif., vol. 3, pp. 117–122, 1989.

M. Langsam et al., "Substituted Propyne Polymers", Polymer Engineering and Science, vol. 29, pp. 44–54, 1989.

N. A. Platé et al., "Gas and Vapor Permeation and Sorption in Poly(trimethylsilylpropyne)", Journal of Membrane Science, vol. 60, pp. 13–24, 1991.

S. R. Auvil et al., "Mechanisms of Gas Transport in Poly(1–trimethylsilyl–propyne)", Polymer Preprints, vol. 32 (3), pp. 380–383, 1991.

*Primary Examiner*—Robert Spitzer
*Attorney, Agent, or Firm*—J. Farrant

[57] ABSTRACT

A process for separating $C_3+$ hydrocarbons, particularly propane and butane, from natural gas. The process uses a poly(trimethylsilylpropyne) membrane.

11 Claims, 6 Drawing Sheets

NATURAL GAS TREATMENT PROCESS USING PTMSP MEMBRANE

This invention was made with Government support under Contract Number DE-FG03-90ER81066, awarded by the Department of Energy. The Government has certain rights in this invention.

This is a continuation of application Ser. No. 153,272, filed Nov. 16, 1993, now abandoned, which was a continuation of application Ser. No. 970,699, filed Nov. 4, 1992, now abandoned.

FIELD OF THE INVENTION

The invention relates to a gas-separation process. More particularly, the invention concerns the removal of $C_3+$ hydrocarbons from natural gas.

BACKGROUND OF THE INVENTION

Natural gas is very important both as fuel and as a basic industrial raw material. The composition of raw natural gas varies from field to field. It may contain more than 95% methane with small amounts of other hydrocarbons, nitrogen, carbon dioxide, hydrogen sulfide, or water vapor. On the other hand, it may contain up to 15% ethane, propane, butane, or combinations of these components. For safety reasons, the Btu rating of natural gas to be carried through a pipeline is controlled within a narrow range (950–1,050 Btu/ft$^3$). However, because of the higher Btu values of ethane, propane, butane, and pentane, natural gas streams containing significant amounts of these components are too high in Btu value to be fed directly to a pipeline or to be used directly as fuel. Equally important, higher hydrocarbons are too valuable industrially to be burned as secondary components in gas. Thus, the natural gas stream must undergo some form of treatment to remove undesirable components, to bring the Btu value to the standard level, and to recover the valuable higher hydrocarbons.

U.S. Pat. No. 4,857,078 discloses a process for removing propane, butane and higher hydrocarbons from natural gas using a composite membrane with an ultrathin rubbery selective layer.

The optimum separation membrane for use in any gas-separation application combines high selectivity with high flux. Thus the membrane-making industry has engaged in an ongoing quest for membranes with improved flux/selectivity performance.

Gas and vapor permeation through polymer membranes is usually rationalized by the solution-diffusion model. This model assumes that the gas phases on either side of the membrane are in thermodynamic equilibrium with their respective polymer interfaces, and that the interfacial sorption and desorption process is rapid compared with the rate of diffusion through the membrane. Thus the rate-limiting step is diffusion through the polymer membrane, which is governed by Fick's law of diffusion. In simple cases, Fick's law leads to the equation $$Q=(J/\Delta p)=(D \cdot S)/l, \quad (1)$$

where Q is the pressure-normalized flux [cm$^3$(STP)/ cm$^2$.s.cmHg], J is the volumetric flux per membrane area [cm$^3$(STP)/cm$^2$.s], D is the diffusion coefficient of the gas or vapor in the membrane [cm$^2$/s] and is a measure of the gas mobility, l is the membrane thickness, S is the Henry's law sorption coefficient linking the concentration of the gas or vapor in the membrane material to the pressure in the adjacent gas [cm$^3$(STP)/cm$^3$.cmHg], and $\Delta p$ is the pressure difference across the membrane. The product D·S can also be expressed as the permeability coefficient, P, a measure of the rate at which a particular gas or vapor moves through a membrane of standard thickness (1 cm) under a standard pressure difference (1 cmHg). As can be seen from Equation 1, the pressure-normalized flux is inversely proportional to the membrane thickness.

For a given membrane material, the ideal selectivity, $\alpha_{A,B}$, for gas A over B is defined as the ratio of the permeability coefficients of the gases:

$$\alpha_{A,B}=P_A/P_B=(D_A/D_B) \cdot (S_A/S_B), \quad (2)$$

where $P_A$ and $P_B$ are the permeability coefficients of gases A and B, respectively, as determined from the measured pressure-normalized fluxes of two gases, the fluxes being measured separately, each with a pure gas sample, through a defect-free membrane sample of the same thickness, and being expressed in cm$^3$(STP)/cm$^2$.s.cmHg or other consistent units. Selectivity, as defined in Equation 2, is a product of two terms. The first term is the ratio of the diffusion coefficients and is usually called the mobility selectivity. This term reflects the relative size of the permeants. In the case of the separation of organic compounds from permanent gases, such as nitrogen, the diffusion coefficient of the organic vapor is always less than that of nitrogen, so the mobility selectivity term is less than one. The second term is the sorption selectivity and reflects the relative sorption of the two permeants. In general, the more condensable the component, the higher its sorption. Thus, in the case of the separation of a more condensable organic compound from a permanent gas or less condensable organic or inorganic compound, the sorption selectivity term will usually be greater than one. Whether a particular membrane material is selective for the more condensable components of a gas mixture depends on the balance of these two terms for that material.

Figure 2:
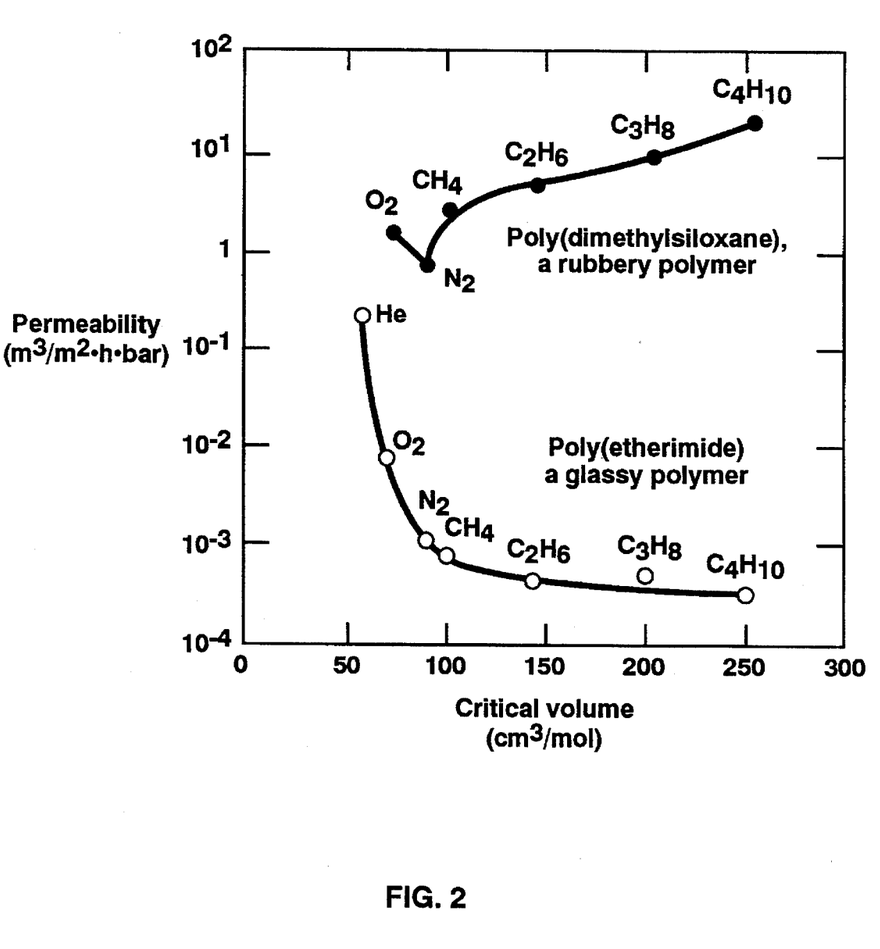
FIG. 2 is a graph of permeability as a function of molecular size, expressed as critical volume, for a typical rubbery and a typical glassy polymer.

Diffusion coefficients are generally several orders of magnitude higher in rubbery polymers than in glassy polymers and are substantially less dependent on the penetrant size, particularly in the case of large, condensable molecules. As a result, the selectivity of rubbery polymers is mainly determined by the sorption term and rubbery materials are usually condensable-selective. Glassy polymer selectivities, on the other hand, are dominated by the diffusion term and glassy polymers are usually gas-selective. Data illustrating the standard behavior of rubbery and glassy polymers are shown in FIG. 2, originally prepared by the German company, GKSS. Only rubbery polymers, therefore, have been considered useful for separating condensable organic compounds from other gases and vapors.

In recent years, some polymer materials with unusually high permeabiliites have been synthesized. Perhaps the best known of these, and representative of the class, is polytrimethylsilylpropyne (PTMSP), a polymer synthesized by T. Masuda et al. in Japan. Although PTMSP is glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.5–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide.

These pure-gas data suggest that PTMSP will exhibit poor selectivity for most gas separations. For example, a paper by N. A. Platé et al. ("Gas and vapor permeation and sorption in poly(trimethylsilylpropyne", Journal of Membrane Science, Vol. 60, pages 13–24, 1991) gives polymer permeabilities of $2.6\times 10^{-7}$ $cm^3(STP).cm/cm^2.s.cmHg$ for oxygen and $1.5\times 10^{-7}$ $cm^3(STP).cm/cm^2.s.cmHg$ for nitrogen, giving a calculated selectivity of 1.7. The same reference gives polymer permeabilities of $2.7\times 10^{-7}$ $cm^3(STP).cm/cm^2.s.cmHg$ for methane, $1.9\times 10^{-7}$ $cm^3(STP).cm/cm^2.s.cmHg$ for propane and $2.3\times 10^{-7}$ $cm^3(STP).cm/cm^2.s.cmHg$ for n-butane, giving a calculated selectivity for propane/methane of 0.7 and for butane/methane of 0.85. A paper by M. Langsam et al. ("Substituted Propyne Polymers. I. Chemical surface modification of poly[1-(trimethylsilyl-)propyne] for gas separation membranes", Gas Separation and Purification, Vol. 2, pages 162–170, 1988) gives a carbon dioxide/methane selectivity for PTMSP of 2.07, compared with 9.56 for silicone rubber. A paper by K. Takada et al. ("Gas Permeability of Polyacetylenes Carrying Substituents", Journal of Applied Polymer Science, Vol. 30, pages 1605–1616, 1985) includes the statement that: "Very interestingly, poly[1-(trimethylsilyl)-1-propyne] films show permeability coefficients as high as $10^{-7}$–$10^{-6}$ to every gas. However, permselectivities of these films for two different gases are relatively poor." Thus the material was characterized, at least initially, as of great academic interest, because of its extraordinary permeability, but exhibiting selectivities too low for commercial use.

As soon as its remarkable permeability properties were announced, PTMSP attracted attention from the membrane community at large. A number of experimenters reported that the permeation properties of PTMSP appear to be unstable over time, raising further doubts as to the usefulness of the material for practical applications. In particular, the oxygen permeability was found to drop dramatically. For example, Masuda et al. found that the oxygen permeability fell to about 1% of its orginal value when the membrane was left at room temperature for several months.

More recently, the consensus of opinion in the art has been that the loss in permeability arises primarily from sorption of volatile materials from the environment of the membrane. If the membrane is mounted in a system containing a vacuum pump, for example, vaporized or aerosol vacuum oil may be sorbed into the membrane material. A similar effect may occur if the membrane is simply standing in the air for prolonged periods. For example, a paper by T. Nakagawa et al. ("Polyacetylene derivatives as membranes for gas separation", Gas Separation and Purification, Vol. 2, pages 3–8, 1988) states that "the PMSP membrane showed strong affinity to volatile materials. It was considered that, in addition to the thermal hysteresis, the reason for unstable gas permeability is the adsorption of volatile materials existing in the atmosphere."

This property has been turned to advantage by several workers. For example, the above-cited Nakagawa paper also discusses the performance of PTMSP membranes that have been deliberately exposed to a variety of additives, including dioctyl phthlate (DOP) and polyethylene glycol (PEG). The treated membranes exhibited permeation properties stable over time, and, although the oxygen permeability was reduced from 8,000 Barrer to about 300–400 Barrer, the oxygen/nitrogen selectivity improved from 1.6 to 3.3, rendering the membranes "prospective as membranes for oxygen enrichment". Similar results have been reported by S. Asakawa et al. ("Composite membrane of poly[1-(trimethylsilyl)-propyne] as a potential oxygen separation membrane", Gas Separation and Purification, Vol. 3, pages 117–122, 1989), who apparently produced stable PTMSP membranes by coating the PTMSP layer with a protective layer of silicone rubber, and who also concluded that, "This membrane, therefore, may be promising for industrial oxygen separation." M. Langsam et al. (U.S. Pat. No. 4,859,215, Aug. 22, 1989, assigned to Air Products and Chemicals, Inc.) added Nujol oil, silicone oil or ethylene oxide-based surfactants to the casting solution when preparing PTMSP membranes. The membranes showed permeation properties stable over time, reduced permeabilities and improved selectivities for oxygen/nitrogen and carbon dioxide/nitrogen.

Other attempts to modify the material to increase its selectivity have been made. For example, U.S. Pat. No. 4,657,564, to M. Langsam, assigned to Air Products and Chemicals, Inc., describes a surface fluorination technique that increases the oxygen/nitrogen selectivity by at least 50% over its unmodified value. Thus, use of the material has focued on oxygen/nitrogen separation, and ways in which the extraordinary oxygen permeability can be preserved yet the low oxygen/nitrogen selectivity enhanced.

Almost all of the permeation data that have been published concern pure gas experiments. However, a study by S. R. Auvil et al. ("Mechanisms of gas transport in poly(1-trimethylsilyl-1 propyne"), Polymer Preprints, Vol. 32(3), pages 380–383, 1991) was carried out using mixtures of a heavy gas (carbon dioxide or sulfur hexafluoride) and a light gas (helium or nitrogen). The study showed that the permeability of the light gas is substantially reduced in the presence of the heavy gas. It was postulated that the heavy gas is adsorbed onto surfaces of voids within the structure of the polymer and may be transported through the material by surface diffusion, and further that these surface layers may build up and block diffusion of the light gas through the void areas. The net result was an increase in the selectivity for the heavy gas over the light gas when measured with gas mixtures rather than calculated from pure gas permeabilities.

To summarize the above discussion, it may be seen that glassy, high-free-volume polymers, of which PTMSP is the most widely studied example, exhibit unusual gas transport properties. These properties do not conform to, and do not appear to follow from the standard solution/diffusion model of gas transport. Furthermore, the properties are affected in a not fully understood fashion by sorption of a variety of volatile materials. Behavior with mixed gases has not been studied, except in a very limited way, but the results obtained again are inconsistent with those obtained from conventional polymer materials.

SUMMARY OF THE INVENTION

The invention is a process for separating $C_3+$ hydrocarbons from natural gas. Natural gas typically has methane as its major component, and may also contain significant quantities of ethane, propane, butane and other higher hydrocarbons, nitrogen, carbon dioxide, water vapor, and hydrogen sulfide.

The process involves running the natural gas stream across a membrane that is selectively permeable to $C_3+$ hydrocarbons over methane. The higher hydrocarbons are therefore concentrated in the stream permeating the membrane; the residue, non-permeating, stream is correspondingly depleted in higher hydrocarbons. The process differs from processes previously used for separating $C_3+$ hydrocarbons from natural gas in the nature of the membrane that is used.

The membrane is made from poly(trimethylsilylpropyne) (PTMSP), a material characterized as follows:
1. Glassy
2. Unusually high free volume within the polymer material
3. Pure gas data suggest poor selectivity
4. Measured mixed gas selectivity is substantially better than calculated pure gas selectivity
5. Selectivity depends on thickness Thus, PTMSP has characteristics and exhibits properties that are fundamentally different from those of the membranes previously used for this type of separation.

Because PTMSP is glassy and rigid, an unsupported film of the polymer may often be usable as a single-layer gas separation membrane. Alternatively, the separation membrane may be a layer that forms part of a thicker structure, such as an asymmetric membrane or a composite membrane.

The driving force for permeation across the membrane is the pressure difference between the feed and permeate sides, which can be generated in a variety of ways. The membrane separation process produces a permeate stream enriched in $C_3+$ hydrocarbons compared with the feed and a residue stream correspondingly depleted.

The membrane separation process may be configured in many possible ways, and may include a single membrane unit or an array of two or more units in series or cascade arrangements. Eighty to 90% or above removal of the $C_3+$ hydrocarbon content of the feed to the membrane system can typically be achieved with an appropriately designed membrane separation process.

The process is useful in separating propane, butane, pentane, etc. from natural gas. The feed streams which can be treated by the process of the present invention arise from a variety of sources, including, but not limited to, natural gas fields, associated gases from oil fields, and produced gas streams from oil refineries or petrochemical processing plants. The scope of the invention is not intended to be limited to any particular gas streams, but to encompass any situation where a gas stream containing primarily methane and at least one other hydrocarbon gas is to be separated. The composition of the gas may vary widely, from a mixture that contains 95%+pure methane, with small amounts of ethane, other hydrocarbons, water vapor, hydrogen sulfide, carbon dioxide and nitrogen, to streams that contain substantial percentages of $C_3+$ hydrocarbons or carbon dioxide.

The process has advantages over processes that were previously used for such separations in that it combines high flux of the higher hydrocarbons with unexpectedly high mixed gas selectivities, such as 6 for propane/methane and 12 for butane/methane.

It is an object of the present invention to provide a membrane-based process for separation of propane and higher hydrocarbons from natural gas and similar gas mixtures. Additional objects and advantages of the invention will be apparent from the description below to those of ordinary skill in the art.

It is to be understood that the above summary and the following detailed description are intended to explain and illustrate the invention without restricting its scope.

DETAILED DESCRIPTION OF THE INVENTION

The term membrane unit as used herein means one or more membrane modules arranged in parallel, so that a portion of the incoming gas stream passes through each one. "Series arrangement" means an arrangement of membrane modules or units connected together such that the residue stream from one module or unit becomes the feedstream for the next. "Cascade arrangement" means an arrangement of membrane modules or units connected together such that the permeate stream from one module or unit becomes the feedstream for the next.

The term $C_3+$ hydrocarbon(s) is an abbreviation meaning any hydrocarbon having three or more carbon atoms.

The process of the invention involves running a natural gas stream across a membrane that is selectively permeable to $C_3+$ hydrocarbons over methane, ethane and nitrogen. The process differs from processes previously used for separating higher hydrocarbons from natural gas streams in the nature of the membrane that is used. As discussed in the background section above, the conventional belief of the art is that rubbery membranes should be used when a condensable organic compound is to be separated from a gas mixture. For example, U.S. Pat. No. 4,857,078, which concerns removal of $C_3+$ hydrocarbons from natural gas, states that: "Glassy polymers . . . are, however, relatively unselective for one hydrocarbon over another, and are unsuitable for separating methane or ethane from $C_3$ or $C_3+$ hydrocarbons. In fact, these types of membrane often are more permeable to methane than to the $C_2+$ hydrocarbons." (column 2, lines 46–52). The patent goes on to describe suitable membranes for this particular condensable/non-condensable separation, as follows: "The permselective membranes used in the invention then are rubbery non-crystalline polymers, that is they have a glass transition temperature at least 20° C. below the normal operating temperature of the system. Thermoplastic elastomers are also useful." (column, 7, lines 8–12). Likewise, U.S. Pat. No. 5,089,033, which covers a hybrid process including condensation and membrane separation for removing condensable components in general from gas streams, states that: "To remove an organic vapor as the preferentially permeating component, a number of rubbery polymers could be used. Examples include nitrile rubber, neoprene, silicone rubbers, including polydimethylsiloxane, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers and styrene/ethylene/butylene block copolymers. Particularly preferred rubbers are silicone rubbers." (Col. 9, lines 29–41).

In complete contrast to these teachings, the membranes that are used to separate $C_3+$ hydrocarbons from natural gas streams according to the present invention are made from poly(trimethylsilylpropyne) (PTMSP). The structure of PTMSP is:

and the material characterized as follows:
1. Glassy
2. Unusually high free volume within the polymer material
3. Pure gas data suggest poor selectivity
4. Measured mixed gas selectivity is substantially better than calculated pure gas selectivity
5. Selectivity depends on thickness 1. Glassy The double carbon bond in the backbone and the bulky side groups make PTMSP a very rigid material. The glass transition temperature, $T_g$ is high; in fact, to date, no glass-to-rubber transition has been observed. The material remains glassy at least up to 200° C., and some publications state that the $T_g$ is above 300° C. Thus, the material is always completely glassy and rigid under the conditions in which it is used in the process of the invention.

2. Unusually high free volume within the polymer material

The stiffness of the material, coupled with the bulky side groups, which appear to inhibit close packing of the polymer chains, means that PTMSP is also characterized by an unusually high free volume, as estimated from vapor solubility data as in W. J. Koros et al., J. Membrane Science, Vol. 2, page 165, 1977. Conventional glassy polymers typically have free volumes, $V_F$, within the polymer itself of a few percent, such as 3% for polycarbonate, or 6% for polyphenylene oxide. PTMSP has a free volume of about 25% according to this method.

3/4. Pure gas data suggest poor ideal selectivity/Measured mixed gas selectivity is better than calculated pure gas ideal selectivity In the gas-separation-membrane art, two types of selectivity are commonly reported. One is the ideal selectivity, which is the calculated ratio of the measured pressure-normalized fluxes of two gases, the fluxes being measured separately, each with a pure gas sample, through a defect-free membrane sample of the same thickness, and being expressed in $cm^3(STP)/cm^2.s.cmHg$ or other consistent units. The other is the actual or mixed-gas selectivity, measured with a gas mixture containing two or more gases to be separated.

As discussed in the background section above, permeability data from the published literature suggest that PTMSP has poor ideal selectivities for one hydrocarbon over another and may be slightly selective for methane over the higher hydrocarbons. As reported in the Examples section below, we also found that permeation tests performed with pure gas samples yielded low calculated ideal selectivities, although we observed that PTMSP is selective for the higher hydrocarbons over methane.

We found, however, that the measured mixed-gas selectivity was dramatically better than the ideal selectivity. Typically, the mixed gas selectivity was at least three times the ideal selectivity, and frequently more, such as five times, seven times or ten times the ideal selectivity.

It is certainly not unknown for a gas-separation membrane under experimental conditions or use to exhibit a lower selectivity than the ideal selectivity, for at least three possible reasons:

(i) The separation membrane has one or more defects that permit indiscriminate bulk flow of both gases, thereby lowering the selectivity. The thinner the membrane, the more likely is this to be a problem.

(ii) The separation membrane is supported on a substrate that offers a resistance to gas permeation that is not insignificant compared with the resistance of the separation membrane and, therefore, has an influence on the overall selectivity of the composite. This phenomenon is discussed in detail in co-owned U.S. Pat. No. 4,931,181.

(iii) The mixed-gas selectivity is inherently lower than the ideal selectivity calculated from pure gas measurements. This is a very common phenomenon, often caused by plasticization or swelling of the membrane by one component in the mixture. Condensable hydrocarbons are very likely to cause such an effect.

It is, however, very surprising for the mixed gas selectivity to be better than the ideal selectivity, especially in the case of the gas streams to which the process of the invention can be applied.

5. Selectivity of material depends on thickness

PTMSP possesses a surprising and hitherto totally unsuspected property, in that, when an isotropic, essentially defect-free film of the material is used to separate one gas from another, the separation selectivity exhibited by the film depends on its thickness. The actual selectivity increases, up to a maximum value, as film thickness increases. To applicant's knowledge, this unexpected behavior has never been observed previously with any other polymer materials. The reason why this behavior is observed is not yet known, but it appears that gas transport is not conforming completely to the solution/diffusion model that is the standard approach for understanding gas transport through dense polymer films. This attribute can be used in tailoring membrane performance to suit specific applications, and is covered more fully in co-owned and application, Ser. No. 971,414, now abandoned, filed on Nov. 4, 1992.

Thus, PTMSP has characteristsics and exhibits properties that are fundamentally different from those of the membranes previously used for this type of separation.

Membranes useful in the process of the invention may be formed in a variety of ways. Because PTMSP is glassy and rigid, an unsupported film of the polymer may often be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. Applicants prefer to use composite membranes.

The membrane incorporating the separation membrane may be formed as a flat sheet, a hollow fiber or any other convenient form, and housed in any appropriate type of module, such as plate-and-frame, potted fiber or spiral-wound. The membrane unit comprises the membrane element and the membrane housing. The number of membrane elements required will vary according to the volume of gas to be treated, the composition of the feed gas, the desired compositions of the permeate and retentate streams, the operating pressure of the system, and the available membrane area per element. Systems may contain as few as one membrane element or as many as several hundred or more. The elements may be housed individually in pressure vessels or multiple elements may be mounted together in a sealed housing of appropriate diameter and length.

In the process of the invention, a natural gas feed stream containing one or more $C_3+$ hydrocarbons is passed through a membrane separation step. Depending on the origin and composition of the gas, it may be desirable to pass the gas through a filter, phase separator, heater, etc. before it enters the membrane system to remove entrained water or hydrocarbons in liquid or aerosol form. Any other pre-treatment to remove contaminants or change the gas composition may also be performed as appropriate.

Figure 1:
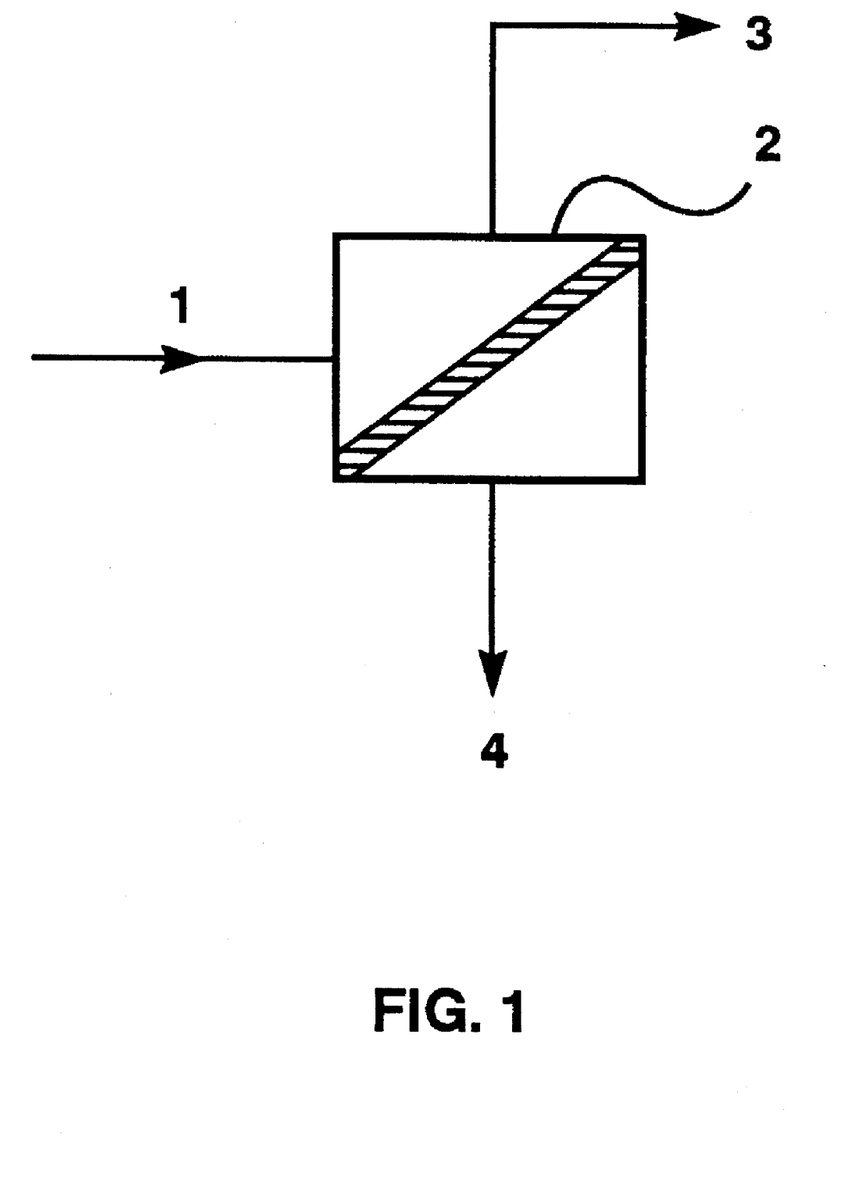
FIG. 1 is a schematic drawing of the process of the invention in its simplest form.

The membrane-separation process is shown schematically in its very simplest form in FIG. 1. Referring to this figure, feed gas stream, 1, passes to a membrane separation unit, 2, containing one or more membranes. The membrane separation step involves running the feed gas stream across a membrane that is selectively permeable to the $C_3+$ hydrocarbon compounds that are to be removed. These higher hydrocarbons are concentrated in the stream, 4, permeating the membrane; the residue or retentate, non-permeating, stream, 3, is correspondingly depleted in higher hydrocarbon compounds. The retentate stream is at essentially the same pressure as the feed, and may be used directly as a fuel gas, pipelined, or utilized in any other appropriate manner.

The pressure at which raw natural gas emerges from the well varies considerably from field to field, although pressures up to 5000 psi are not uncommon. Polymer membranes can typically withstand pressure differences between the feed and permeate side up to about 1,500–2000 psi, so it may sometimes be necessary to lower the gas pressure before it can be fed to the membrane system.

If the feed gas stream to be treated is at high pressure compared with atmospheric, the separation may be effected simply by making use of this high pressure to provide an adequate driving force and pressure ratio. Otherwise, a pressure difference can be provided by compressing the feed stream, by drawing a vacuum on the permeate side of the membrane, or a combination of both.

Depending on the performance characteristics of the membrane, and the operating parameters of the system, the process can be designed for varying levels of hydrocarbon recovery. Single-stage gas-separation processes typically remove up to about 80–95% of the preferentially permeating component from the feed stream and produce a permeate stream that has five times or more the concentration of that component of the feed gas. This degree of separation is adequate for many applications. If the residue stream requires further purification, it may be passed to a second bank of modules for a second processing step. If the permeate stream requires further concentration, it may be passed to a second bank of modules for a second-stage treatment. Such multistage or multistep processes, and variants thereof, will be familiar to those of skill in the art, who will appreciate that the process may be configured in many possible ways, including single-stage, multistage, multistep, or more complicated arrays of two or more units in series or cascade arrangements.

In general, the pressure on the permeate side of the membrane will be substantially lower than that on the feed side. Depending on the application involved the permeate gas may be recompressed, pipelined, liquified, recycled, flared, etc. Many possible applications in the gas, oil, or petrochemical industries, for example, are envisaged.

In many parts of the world, associated gases from oil wells are simply flared off or reinjected into the reservoir or an adjoining reservoir. The sites are often remote, or on offshore platforms where space is at a premium. It is possible to use the membrane-based process described herein to remove propane and heavier components from associated gases. The gases are fed to the membrane system either directly from the production separator, or after compression if necessary, and the resulting hydrocarbon-rich permeate may be compressed, cooled, and recycled or otherwise processed to produce natural gas liquids (NGL) suitable for adding to the crude oil from the production separators. In this way valuable hydrocarbons that would otherwise be flared or reinjected may be recovered.

A second possible application is in the recovery of propane and higher hydrocarbons from gas streams containing much carbon dioxide and/or nitrogen. In the oil industry, nitrogen or carbon dioxide floods are used to recover incremental oil from partially depleted oil fields. When the oil is produced, large volumes of associated gases containing correspondingly large quantities of the flood gas are generated. These gases are compressed for reinjection, and must be subjected to complex and costly processing steps if the valuable hydrocarbon component is to be recovered. The process of the invention, which could treat these large gas volumes, leaving a lean gas retentate stream for reinjection, offers a simple, economic alternative.

A third application is in Btu control. For example, natural or associated gases are often used on oil or gas fields as fuel for reciprocating engines, turbines or other equipment. Raw gas frequently has a Btu value in excess of the maximum safe limit for the engine. The same situation applies to natural gas streams that are intended for a pipeline, where Btu values are normally kept within the range 950–1,050 Btu/scf. In either case, the process herein described may be used to remove and recover propane and heavier components and thereby reduce the Btu value of the fuel gas.

A fourth application is dewpoint control for natural gas, which typically must have a required hydrocarbon dewpoint to eliminate condensation of hydrocarbon liquids in the pipeline or simply to meet sales specifications. The process of the invention can remove the propane and heavier hydrocarbons, thereby reducing the hydrocarbon dewpoint to the required level. The retentate stream may then be fed to the pipeline; the hydrocarbon-enriched permeate is suitable for compression and/or to make NGL for utilization as appropriate.

A fifth application is NGL recovery from refinery gases or off gases from the petrochemical industry. Gas streams from these sources contain hydrogen in addition to propane and heavier hydrocarbons. The present invention can be used to remove propane and the heavier hydrocarbon components, leaving a higher purity hydrogen retentate, and a permeate that can be processed to produce an NGL product.

A sixth application is in pretreatment of hydrocarbon-laden gas streams. Other commercial membranes-based systems, such as those employing cellulose-type membranes, may require the feed gas to be pretreated to remove hydrocarbon constituents that may damage the membrane. Incorporation of the present invention into the system prior to the existing membrane process represents a simple, low-cost method of harmful hydrocarbon removal. The permeate from the membranes of the present invention can be used as NGL.

The abovementioned applications and the examples which follow are given to illustrate the invention and should not be construed as limiting the scope of the invention in any way.

The invention is now further illustrated by the following examples, which are intended to be illustrative of the invention, but are not intended to limit the scope or underlying principles of the invention in any way.

EXAMPLES 1–3

Comparative examples with various rubbery polymers. Not in accordance with the invention

EXAMPLE 1

An asymmetric, microporous polysulfone support membrane was prepared. A sealing coat of silicone rubber about 1 μm thick was applied to the skin side of the support membrane. Composite membranes were prepared by hand-coating a solution of 5 wt % ethylene/vinyl acetate (EVA, Elvax 150) in cyclohexane onto the skin side of the asymmetric support membrane by a continous dip-coating method. The polymer solution was applied at room temperature and the composite membrane was air-dried.

The membranes were tested with pure nitrogen, oxygen, and methane at 50 psig feed pressure to ensure that the EVA coating was defect-free.

The composite membranes with defect-free separation layers were evaluated in room-temperature gas-separation experiments. The membranes were mounted in a test cell exposed to a synthetic natural gas mixture consisting of 86% methane, 10% ethane, 3% propane and 1% butane on the feed side. The feed pressure was maintained at 500 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The same preparation technique and permeation tests were repeated, except that the membrane was made from a 5 wt % Elvax 450 solution.

The pressure-normalized gas fluxes and the propane/methane and butane/methane selectivities of the membranes are given in Table 1.

TABLE 1

Permeation Properties of Elvax 150 and 450 Composite Membranes

| Membrane | Pressure-normalized flux ($\times 10^{-6}$ cm(STP)/cm$^2$ · s · cmHg) | | Selectivity | |
| --- | --- | --- | --- | --- |
| | Pure methane | Methane in gas mixture | Propane/ methane | Butane/ methane |
| Elvax 150 | 3.5 | 6.8 | 2.8 | 5.5 |
| Elvax 450 | 1.4 | 5.6 | 1.9 | 3.0 |

EXAMPLE 2

Composite membranes were prepared by coating a solution of 3 wt % chlorinated polyethylene (25% chlorine grade) in 1,1,2-trichloroethane onto an asymmetric polyamide (Trogamid) support membrane, using the same general techniques as in Example 1. Permeation tests were conducted as in Example 1.

Composite membranes were prepared by coating a solution of 4 wt % nitrile rubber (21% acrylonitrile) in methylethylketone (MEK) onto an asymmetric polyetherimide (PEI) support membrane, using the same general techniques as in Example 1. The membrane was overcoated with a sealing layer of silicone rubber. Permeation tests were conducted as in Example 1.

The pressure-normalized gas fluxes and the propane/methane and butane/methane selectivities of the membranes are given in Table 2.

TABLE 2

Permeation Properties of Polyethylene and Nitrile Rubber Membranes

| Membrane | Pressure-normalized flux ($\times 10^{-6}$ cm(STP)/cm$^2$ · s · cmHg) | | Selectivity | |
| --- | --- | --- | --- | --- |
| | Pure methane | Methane in gas mixture | Propane/ methane | Butane/ methane |
| Chlorinated polyethylene | 2.0 | 4.8 | 1.7 | 2.7 |
| Nitrile rubber | 0.9 | 2.1 | 1.6 | 2.8 |

EXAMPLE 3

Composite membranes were prepared by coating a solution of 8.75 wt % silicone rubber in cyclohexane onto an asymmetric polysulfone support membrane, using the same general techniques as in Example 1, but heating the membrane after coating to crosslink the silicone rubber. Permeation tests were conducted as in Example 1.

Permeation experiments were also carried out with some previously made composite membranes which consisted of a selective layer of a polybutadiene/silicone rubber blend on a polysulfone support.

The pressure-normalized gas fluxes and the propane/methane and butane/methane selectivities of the membranes are given in Table 3.

TABLE 3

Permeation Properties of Silicone Rubber and Polybutadiene Blend Membranes

| Membrane | Pressure-normalized flux ($\times 10^{-6}$ cm(STP)/cm$^2$ · s · cmHg) | | Selectivity | |
| --- | --- | --- | --- | --- |
| | Pure methane | Methane in gas mixture | Propane/ methane | Butane/ methane |
| Silicone rubber | 4.2 | 5.8 | 3.7 | 6.1 |
| Polybutadiene blend | 2.3 | 3.0 | 5.0 | 9.3 |

Reviewing Examples 1–3, it may be seen that in all cases, the methane flux measured with mixed gas samples is higher than the pure methane flux. This increase in methane flux is caused by plasticization of the membrane by the higher hydrocarbons in the feed. The higher methane flux results in a lower hydrocarbon/methane selectivity. This behavior is typical of rubbery polymer membranes.

EXAMPLE 4

PTMSP films of thicknesses up to about 200 μm were hand-cast from a solution of 5% PTMSP in toluene onto glass plates. The films were mounted in a test cell and pure gas permeation measurements were made, using the same general technique as in Example 1, except that pure gases only were used and the feed gas pressure was 50 psig. The apparent thickness of the PTMSP layer was obtained by dividing the nitrogen permeability coefficient by the pure pressure-normalized nitrogen flux through the membrane.

The ideal selectivity was calculated from the ratio of the pure gas pressure-normalized fluxes. The results are given in Table 4.

TABLE 4

Pure-Gas Transport Properties of PTMSP

| Gas | Permeability (Barrer) | Selectivity (Gas/N$_2$) | Selectivity (Gas/CH$_4$) |
| --- | --- | --- | --- |
| Nitrogen | 6,400 | 1.0 | 0.43 |
| Oxygen | 9,600 | 1.5 | 0.65 |
| Methane | 14,800 | 2.3 | 1.0 |
| Propane | 40,000 | 6.3 | 2.7 |
| Butane | 94,000 | 14.6 | 6.4 |

These selectivities appear to be too low to make this a practical method for separating higher hydrocarbons from methane in gas mixtures.

EXAMPLE 5

Comparison of pure-gas and mixed-gas behavior

Figure 3:
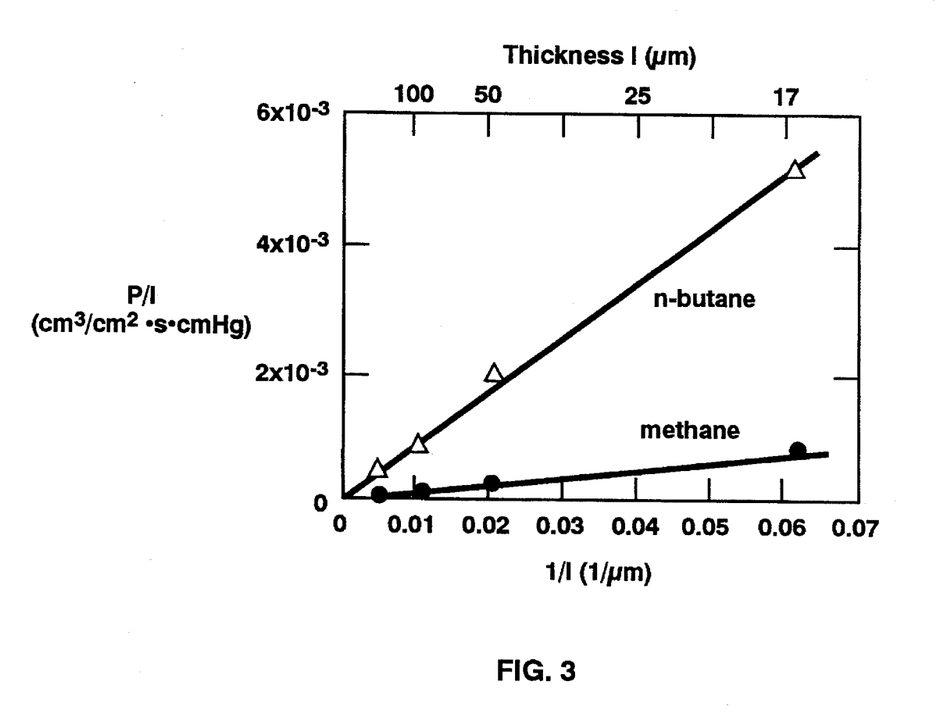
FIG. 3 is a graph of pure gas butane and methane pressure-normalize fluxes plotted as a function of inverse separation membrane thickness.

A set of experiments was performed to compare pure-gas and mixed-gas fluxes, permeabilities and selectivities. In the first experiment, PTMSP films of thicknesses 16, 48, 90 and 200 μm were prepared and tested as in Example 4, except that the gases used for the testing were pure methane and pure butane. For the methane tests, the feed pressure was maintained at 50 psig and the permeate side of the membrane was at atmospheric pressure. For the butane tests, the feed pressure was maintained at 5 psig and the permeate side of the membrane was at atmospheric pressure. The pressure-normalized methane and butane fluxes are plotted as function of inverse PTMSP film thickness in FIG. 3. As expected, both plots are straight lines, with flux increasing in inverse proportion to membrane thickness.

Figure 4:
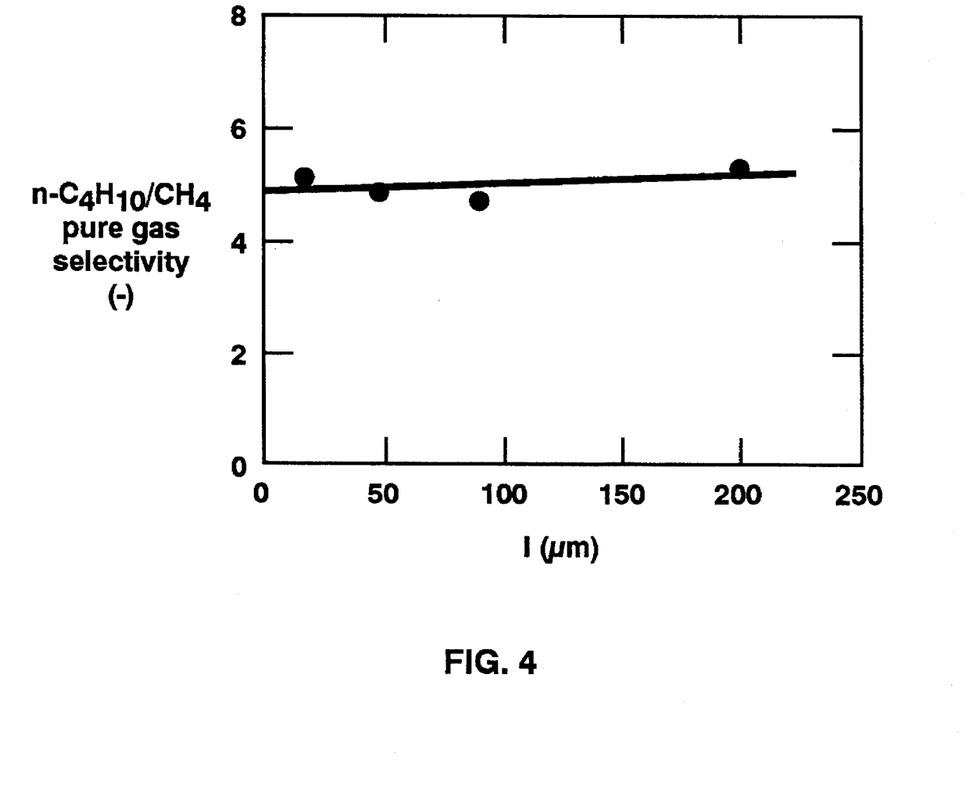
FIG. 4 is a graph of ideal butane/methane selectivity as a function of separation membrane thickness.

The ideal butane/methane selectivity was calculated from the flux data. The results are plotted in FIG. 4. As can be seen from the figure, the ideal selectivity remains essentially constant at about 5–5.5 over the thickness range. This selectivity does not appear to be high enough to make this a practical method for separating butane from methane in gas mixtures.

Figure 5:
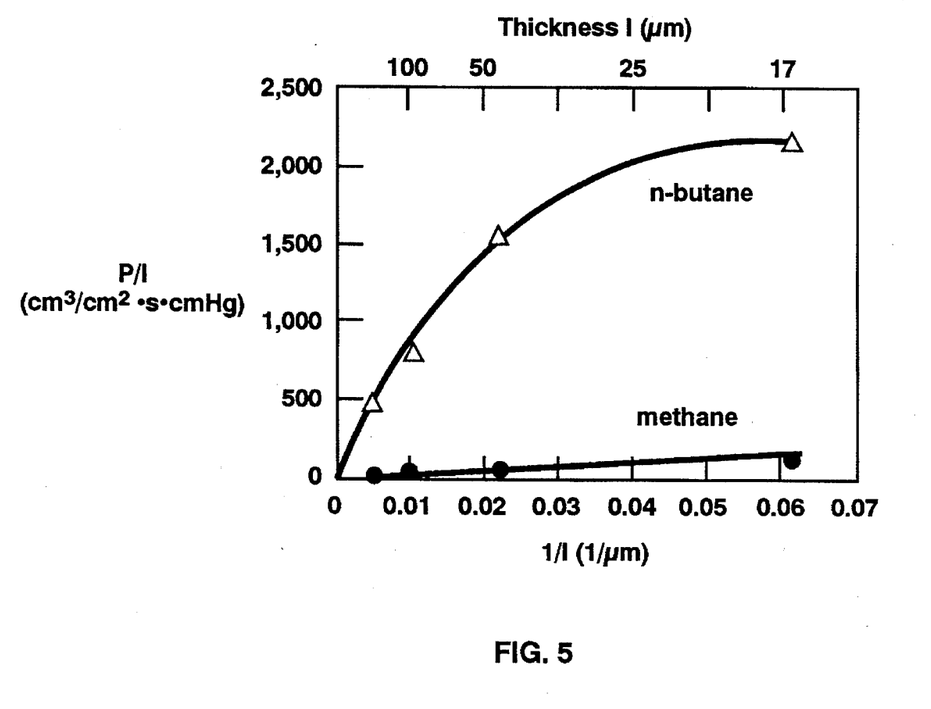
FIG. 5 is a graph of pressure-normalized fluxes plotted as a function of inverse separation membrane thickness. The fluxes were measured with a gas mixture consisting of 86% methane, 10% ethane, 3% propane and 1% butane.
Figure 6:
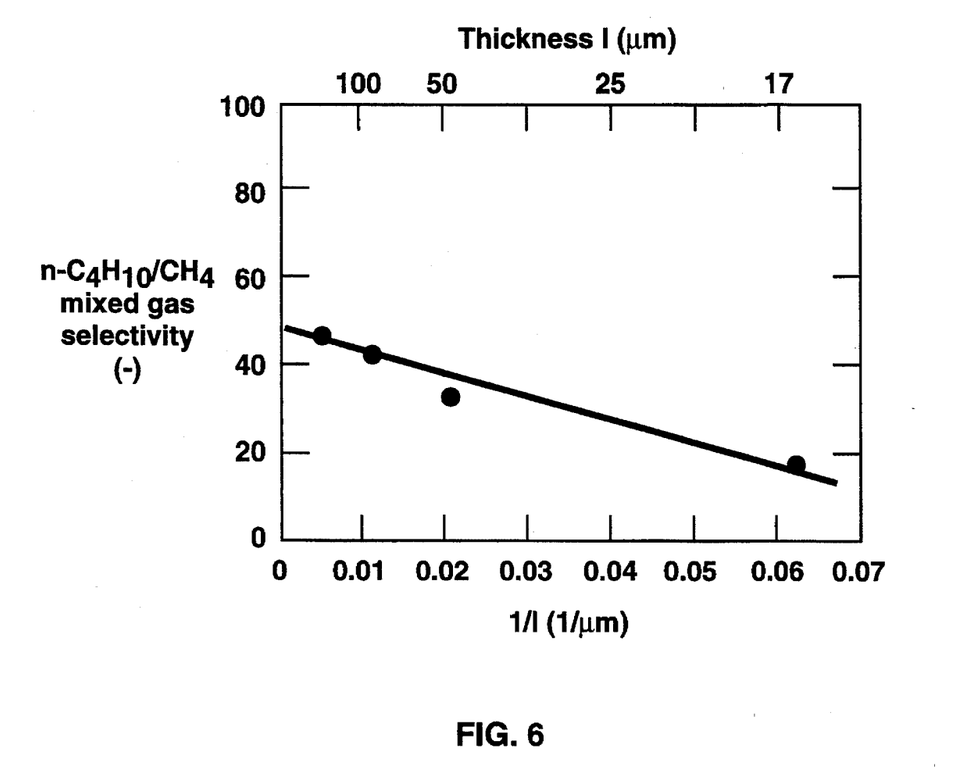
FIG. 6 is a graph of mixed gas butane/methane selectivity plotted as a function of inverse separation membrane thickness. The selectivity was measured with a gas mixture consisting of 86% methane, 10% ethane, 3% propane and 1% butane.

Permeation tests were repeated with mixed gas samples consisting of 86% methane, 10% ethane, 3% propane and 1% butane. The feed pressure was maintained at 300 psig and the permeate side of the membrane was at atmospheric pressure. The pressure-normalized methane and butane fluxes are plotted as a function of inverse PTMSP film thickness in FIG. 5. The methane plot appears to be still close to a straight line, but the butane flux is clearly no longer in direct relationship to the membrane thickness. The mixed gas selectivity is plotted as a function of the inverse PTMSP film thickness in FIG. 6. It is very clear that the selectivity is now (i) better than the ideal selectivity, and (ii) a function of membrane thickness. The maximum achievable butane/methane selectivity as measured at this feed pressure (300 psig) can be read from the ordinate of the graph and is about 50. This is about 10 times the ideal selectivity obtained from the pure gas data.

EXAMPLE 6

Experimental and literature permeation data that we had gathered from a variety of rubbery, glassy and glassy, high-free-volume polymer materials was compared. A comparison of representative materials is given in Table 5.

TABLE 5

Comparison of ideal and mixed-gas selectivities for different polymers

| Membrane material | Ideal (Pure-Gas) Selectivity | | Mixed-Gas Selectivity | |
| --- | --- | --- | --- | --- |
| | Propane/ methane | Butane/ methane | Propane/ methane | Butane/ methane |
| Rubber Silicone rubber | 7.3 | 33 | 3.8 | 6.2 |
| Glass Polysulfone | — | 0.14 | 0.51 | 0.60 |
| High-V$_F$ Glass PTMSP | 2.6 | 5.6 | 8.2 | 27 |

For the typical rubbery polymer, silicone rubber, the ideal selectivity for butane/methane is more than five times greater than the actual, mixed-gas selectivity. For the typical glassy polymer, polysulfone, the polymer has an ideal butane/methane selectivity of 0.14, or a methane/butane selectivity of 7.1. The mixed-gas methane/butane selectivity is 1.7, so not only is the material methane-selective, but again the ideal selectivity is higher, about four times higher than the actual mixed-gas selectivity. In contrast, the PTMSP is butane-selective, and the actual, mixed-gas selectivity is about five times greater than the ideal selectivity.

EXAMPLE 7

An asymmetric, microporous support membrane was prepared. The support membrane, when tested with pure nitrogen, exhibited a pressure-normalized nitrogen flux ranging from 1.3–3.4×10$^{-1}$ cm$^3$(STP)/cm$^2$.s.cmHg.

Composite membranes were prepared by coating a solution of 5% polytrimethylsilylpropyne (PTMSP) in toluene onto the skin side of the asymmetric support membrane by a continous dip-coating method. The polymer solution was applied at a room temperature and the composite membrane was dried in an oven at 50°–60° C.

The membranes were tested with pure nitrogen, oxygen, and methane to ensure that the PTMSP coating was defect-free. The apparent thickness of the PTMSP layer was obtained by dividing the nitrogen permeability coefficient of PTMSP (~6,400 Barrers) by the pure pressure-normalized nitrogen flux through the membrane.

A second set of membranes was prepared by performing the dip-coating step twice to form a thicker separation membrane. A third set of membranes was prepared by repeating the dip-coating step three times. A fourth set of membranes was prepared by repeating the dip-coating step four times. The second, third and fourth sets of membranes were tested with pure gases as above to check for defects. The apparent thickness of the separation membrane for the two-, three- and four-times-coated membranes was calculated in the same way as for the once-coated membrane.

The composite membranes with defect-free separation layers were evaluated in room-temperature gas-separation experiments. The membranes were mounted in a test cell exposed to a gas mixture consisting of 86% methane, 10% ethane, 3% propane and 1% butane on the feed side. The feed pressure was maintained at 100 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The apparent thickness of the PTMSP separation membrane, the pressure-normalized gas fluxes, and the propane/methane and butane/methane selectivities of the membranes are given in Table 6.

TABLE 6

Permeation Properties of PTMSP Composite Membranes

| Separation membrane thickness ($\mu$m) | Pressure-normalized flux ($\times 10^{-5}$ cm$^3$ (STP)/cm$^2 \cdot$ s $\cdot$ cmHg) | | Selectivity | |
|---|---|---|---|---|
| | Pure methane | Methane in gas mixture | Propane/ methane | Butane/ methane |
| 7 (2 coats) | — | 33 | 8 | 92 |
| 11 (3 coats) | 140 | 21 | 9 | 34 |
| 17 (4 coats) | 96 | 14 | 10 | 52 |

As can be seen from Table 6, the separation membrane exhibited a marked selectivity/thickness relationship. The very high flux of the support membrane eliminates resistance of the underlying layer as a contributing factor to the selectivity.

EXAMPLE 8

PTMSP films of thickness 48 $\mu$m and 200 $\mu$m were hand-cast from a solution of 5 wt % PTMSP in toluene onto glass plates. Integrity and permeation tests were conducted as in Example 7. The gas mixture used for the permeation tests consisted of 86% methane, 10% ethane, 3% propane and 1% butane. The feed pressure was varied from 300 psig to 950 psig and the permeate side of the membrane was at atmospheric pressure. The results are given in Tables 7 and 8.

TABLE 7

Permeation Properties of 48-$\mu$m PTMSP Film at Different Feed Pressures

| Feed pressure (psig) | Pressure-normalized flux ($\times 10^{-5}$ cm$^3$ (STP)/cm$^2 \cdot$ s $\cdot$ cmHg) | | | Selectivity | |
|---|---|---|---|---|---|
| | Methane | Propane | Butane | Propane/ methane | Butane/ methane |
| 300 | 4.8 | 42 | 150 | 8.8 | 31 |
| 500 | 5.5 | 41 | 110 | 7.5 | 20 |
| 600 | 6.1 | 42 | 96 | 6.9 | 16 |
| 800 | 5.8 | 35 | 72 | 6.0 | 12 |
| 950 | 5.9 | 32 | 61 | 5.4 | 10 |

TABLE 8

Permeation Properties of 200 $\mu$m PTMSP Film at Different Feed Pressures

| Feed pressure (psig) | Pressure-normalized flux ($\times 10^{-5}$ cm$^3$ (STP)/cm$^2 \cdot$ s $\cdot$ cmHg) | | | Selectivity | |
|---|---|---|---|---|---|
| | Methane | Propane | Butane | Propane/ methane | Butane/ methane |
| 300 | 1.1 | 10 | 50 | 9.1 | 45 |
| 500 | 1.1 | 9.9 | 36 | 9.0 | 33 |
| 600 | 1.2 | 9.9 | 31 | 8.2 | 26 |
| 800 | 1.4 | 9.5 | 26 | 6.8 | 19 |
| 950 | 1.5 | 9.5 | 24 | 6.3 | 16 |

Tables 7 and 8 show that increasing the feed pressure lowers the selectivity. This drop in selectivity results from the simultaneous increase of methane flux and decrease of propane and butane fluxes at higher pressures.

EXAMPLE 9

We prepared a 2-in diameter spiral-wound membrane module containing approximately 900 cm$^2$ of active membrane area. The membranes were composites consisting of a PTMSP layer supported on a nonwoven polyester fabric. The apparent PTMSP layer thickness was 45 $\mu$m.

The hydrocarbon separation properties of the modules were determined by permeation tests as in the previous examples, except that the module was mounted in the test system in place of the membrane test cell. The module was exposed to a feed gas mixture consisting of 86% methane, 10% ethane, 3% propane and 1% butane at feed pressures of 200, 300, and 400 psig, the maximum pressure rating of the module housing. The pressure-normalized gas fluxes and the propane/methane and butane/methane selectivities of the modules are given in Table 9.

TABLE 9

Permeation Properties of Lab-Scale PTMSP Membrane Module

| Feed pressure (psig) | Pressure-normalized flux ($\times 10^{-5}$ cm$^3$ (STP)/cm$^2 \cdot$ s $\cdot$ cmHg) | | | Selectivity | |
|---|---|---|---|---|---|
| | Methane | Propane | Butane | Propane/ methane | Butane/ methane |
| 200 | 3.9 | 31 | 110 | 7.9 | 28 |
| 300 | 3.6 | 27 | 85 | 7.5 | 24 |
| 400 | 3.7 | 27 | 76 | 7.3 | 21 |

The results show that the module effectively separated the higher hydrocarbons from methane.

EXAMPLE 10

The preparation technique and permeation tests of Example 9 were repeated, using a module incorporating a membrane made from a higher molecular weight polymer. The results are given in Table 10.

TABLE 10

Permeation Properties of
Lab-Scale Module with Higher MW Polymer

| Feed pressure | Pressure-normalized flux ($\times 10^{-5}$ cm$^3$ (STP)/cm$^2 \cdot$ s $\cdot$ cmHg) | | | Selectivity | |
|---|---|---|---|---|---|
| (psig) | Methane | Propane | Butane | Propane/methane | Butane/methane |
| 200 | 3.1 | 27 | 120 | 8.7 | 39 |
| 300 | 2.9 | 25 | 86 | 8.6 | 30 |
| 400 | 2.8 | 22 | 62 | 7.8 | 22 |

Comparing the results of Examples 9 and 10 with Example 8, it may be seen that the module properties are comparable with those of the membrane. Between 200 and 400 psig feed pressures, the module selectivities are 7.2–8.7 for propane/methane and 21–39 for butane/methane. These values are within the same range as those obtained for a 48-μm PTMSP film at similar pressures.

EXAMPLE 11

The preparation technique and permeation tests of Example 10 were repeated, using a gas mixture consisting of 82% methane, 10% ethane, 7% propane and 1% butane. The results are given in Table 11.

TABLE 11

Permeation Properties of
Lab-Scale Module with Higher MW Polymer

| Feed pressure | Pressure-normalized flux ($\times 10^{-5}$ cm$^3$ (STP)/cm$^2 \cdot$ s $\cdot$ cmHg) | | | Selectivity | |
|---|---|---|---|---|---|
| (psig) | Methane | Propane | Butane | Propane/methane | Butane/methane |
| 200 | 3.6 | 30 | 120 | 8.3 | 33 |
| 300 | 2.9 | 22 | 72 | 7.6 | 25 |
| 400 | 2.9 | 21 | 61 | 7.2 | 21 |

Once again, the results were similar to those achieved with membrane stamps of the same thickness.

EXAMPLE 12

Composite membranes were prepared by dip-coating solutions of 5% polytrimethylsilylpropyne (PTMSP) in toluene onto a nonwoven polyester fabric backing. The resulting composite membranes were tested with pure nitrogen, oxygen, and methane to ensure that the PTMSP coating was defect-free. The apparent thickness of the PTMSP layer was obtained by dividing the nitrogen permeability coefficient of PTMSP (~6,400 Barrers) by the pure pressure-normalized nitrogen flux through the membrane. The fluxes were consistent with a membrane thickness of about 30 μm thick.

The composite membranes with defect-free separation layers were evaluated in room-temperature gas-separation experiments. The membranes were mounted in a test cell exposed to a gas mixture consisting of 86% methane, 10% ethane, 3% propane and 1% butane on the feed side. The feed pressure was maintained at 500 psig and the permeate side of the membrane was at atmospheric pressure. To maintain a constant feed gas composition, gas was continuously vented from the high-pressure side to promote mixing in the cell. The compositions of the residue and permeate streams were analyzed with an on-line gas chromatograph.

The permeation tests were repeated with a gas mixture saturated with hexane. Saturation was obtained at about 600 psig and 25° C. by passing the pressurized gas mixture as above through a high-pressure bubbler containing liquid hexane. The resulting feed composition was 85.7% methane, 9.6% ethane, 2.9% propane, 1.0% butane, and 0.8% hexane.

The selectivity for the various components over methane, in mixtures with and without hexane, are given in Table 12.

TABLE 12

Selectivity of PTMSP Membrane with
and without n-Hexane in Gas Mixture

| Selectivity | Hexane-saturated feed | Feed mixture without hexane |
|---|---|---|
| Ethane/methane | 3.1 | 3.0 |
| Propane/methane | 6.4 | 6.2 |
| Butane/methane | 14.5 | 15.0 |
| Hexane/methane | 48.7 | — |

The results shown in Table 12 demonstrate that the butane/methane separation performance of the membrane was not affected by the presence of hexane in the feed. The selectivities obtained with the hexane-saturated feed were 3.1 for ethane/methane, 6.4 for propane/methane, and 14.5 for butane/methane. With the feed containing no hexane, the corresponding selectivities were 3.0, 6.2, and 15.0. These two sets of values differ by only 3 to 4%, well within the range of experimental error. The data also indicate that the PTMSP membrane permeated hexane 49 times faster than methane, leading to excellent hexane recovery.

EXAMPLE 13

The experiment of Example 12 was repeated, except that this time a less-condensable gas, carbon dioxide, was added, so that the feed gas mixture had a composition of 86% methane, 10% carbon dioxide, 3% propane and 1% butane. The permeation tests were carried out using a spiral-wound module, as in Examples 9 and 10. The feed gas pressure was 300 psig; the permeate side of the module was at atmospheric pressure. The results are listed in Table 13.

TABLE 13

Selectivity of PTMSP Membrane with
and without Carbon Dioxide in Gas Mixture

| Selectivity | CO$_2$-containing feed | Feed mixture without CO$_2$ |
|---|---|---|
| Ethane/methane | — | 3.3 |
| Propane/methane | 7.8 | 8.0 |
| Butane/methane | 25.8 | 25.7 |
| CO$_2$/methane | 2.8 | — |

No significant change in the separation properties of the membrane module was found when carbon dioxide was present in the feed. The selectivities were 7.8 for propane/methane and 25.8 for butane/methane, equivalent to the values of 8.0 and 25.7 obtained with the gas mixture without carbon dioxide. Furthermore, the mixed-gas carbon dioxide/methane selectivity of 2.8 is about 30% higher than the pure-gas value of 2.1. As expected, the pressure-normalized mixed-gas methane flux was more than 5 times smaller than the pure-gas methane flux because of the co-permeation of the larger, more condensable hydrocarbons. A similar reduction was observed for the mixed-gas carbon dioxide flux, compared to the pure-gas carbon dioxide flux. Thus, the presence of less condensable species in the feed stream did not affect the separation performance of the membrane to any significant extent.

We claim:

1. A process for separating a $C_3+$ hydrocarbon from a gas stream comprising methane and said $C_3+$ hydrocarbon, said process comprising the steps of:

(a) providing an incoming gas stream comprising methane and said $C_3+$ hydrocarbon;

(b) providing a gas-separation membrane comprising poly(trimethylsilylpropyne), said membrane having a feed side and a permeate side and being more permeable to said $C_3+$ hydrocarbon than to methane;

(c) contacting said feed side with said gas stream;

(d) withdrawing from said permeate side a permeate stream enriched in said $C_3+$ hydrocarbon compared with said incoming gas stream;

said membrane being characterized in that it exhibits a selectivity for butane over methane, when tested with gas mixtures containing butane and methane at a feed pressure no greater than about 950 psig, of at least about 10.

2. The process of claim 1, wherein said membrane is a composite membrane.

3. The process of claim 1, wherein said membrane is an asymmetric membrane.

4. The process of claim 1, wherein said $C_3+$ hydrocarbon comprises propane.

5. The process of claim 1, wherein said $C_3+$ hydrocarbon comprises butane.

6. The process of claim 1, wherein said mixed gas selectivity for butane over methane is least 12.

7. The process of claim 1, wherein said membrane exhibits a mixed gas selectivity for propane over methane of at least 6.

8. The process of claim 1, further comprising condensing at least a portion of said permeate stream.

9. The process of claim 1, wherein said $C_3+$ hydrocarbon is selected from the group consisting of propane, butane, pentane, hexane, heptane, octane, nonane, decane, undecane and dodecane.

10. The process of claim 1, wherein said $C_3+$ hydrocarbon comprises hexane.

11. The process of claim 1, wherein said gas stream comprises natural gas.

* * * * *